United States Patent [19]
Kaneko

[11] Patent Number: 5,520,833
[45] Date of Patent: *May 28, 1996

[54] METHOD FOR LUBRICATING COMPRESSION-TYPE REFRIGERATING CYCLE

[75] Inventor: Masato Kaneko, Ichihara, Japan

[73] Assignee: Idemitsu Kosan Co., Ltd., Tokyo, Japan

[ * ] Notice: The term of this patent shall not extend beyond the expiration date of Pat. No. 5,295,357.

[21] Appl. No.: 179,684

[22] Filed: Jan. 11, 1994

Related U.S. Application Data

[63] Continuation-in-part of Ser. No. 897,846, Jun. 12, 1992, abandoned.

[30] Foreign Application Priority Data

Jun. 28, 1991 [JP] Japan ..................... 3-158244

[51] Int. Cl.$^6$ ........................................... C09K 5/04
[52] U.S. Cl. .................... 252/68; 252/67; 62/84; 62/468
[58] Field of Search ................ 252/68; 62/84, 62/468, 67

[56] References Cited

U.S. PATENT DOCUMENTS

| | | | |
|---|---|---|---|
| 4,199,461 | 4/1980 | Olund | 252/68 |
| 4,758,366 | 7/1988 | Parekh | 252/68 |
| 4,829,786 | 5/1989 | Sand et al. | 62/468 |
| 4,916,914 | 4/1990 | Short | 62/84 |
| 5,001,908 | 3/1991 | Mayer | 62/470 |
| 5,154,846 | 10/1992 | Thomas et al. | 252/68 |
| 5,295,357 | 3/1994 | Kaneko | 62/84 |
| 5,368,765 | 11/1994 | Kaneko | 252/68 |
| 5,417,872 | 5/1995 | Fukuda et al. | 252/68 |

OTHER PUBLICATIONS

Chemical Abstracts, 110:215912, Tsvetkov et al, "Synthetic Oil for use with R22 and R502 Cooling Agents", 1989.

*Primary Examiner*—Christine Skane
*Attorney, Agent, or Firm*—Antonelli, Terry, Stout & Kraus

[57] ABSTRACT

A method for lubricating a compression-type refrigerating cycle using a substitute flon refrigerant, i.e., a method for lubricating a compression-type refrigerating cycle which has either or both of an oil separator and a hot gas line, by the use of a substitute flon refrigerant such as 1,1,1,2-tetrafluoroethane and a lubricant having a kinematic viscosity of 2 to 50 cst at 100° C. and an interfacial tension of 25 dyne/cm or above and being a liquid at ordinary temperatures.

15 Claims, 2 Drawing Sheets

METHOD FOR LUBRICATING COMPRESSION-TYPE REFRIGERATING CYCLE

CROSS-REFERENCE TO RELATED APPLICATION

This application is a continuation-in-part of application Ser. No. 07/897,846, filed on Jun. 12, 1992 now abandoned.

BACKGROUND OF THE INVENTION

1. Field of the Invention

The present invention relates to a method for lubricating a compression-type refrigerating cycle. More particularly it relates to a method for lubricating a compression-type refrigerating cycle efficiently without detracting wear resistance, cooling effect and stability by employing a specific lubricant in combination with a refrigerant comprising substitute fluorohydrocarbon (hereinafter referred sometimes to as "flon compound") such as 1,1,1,2-tetrafluoroethane (R-134a).

2. Description of the Related Arts

Conventionally, in a compression-type refrigerating cycle comprising a compressor, a condenser, an expansion valve and an evaporator, a flon compound including a fluorinated hydrocarbon such as dichlorodifluoromethane (R-12) and chlorodifluoromethane (R-22) has been used as the refrigerant. Many lubricants compatible with them has also been made industrially available for use.

However, there have been misgivings that these flon compounds widely used as the refrigerant are liable to cause depletion of the ozone layer and environmental pollution after they are released into the open air. In an effort to prevent environmental pollution, fluorohydrocarbons (or chlorofluorohydrocarbons), for example 1,1,5,2-tetrafluoroethane (R-134a) and the like, have been developed as a possible replacement in recent years. Until now there have been introduced into market many so-called substitute flon compounds with minimized danger of environmental pollution and capable of satisfying said required properties, for example 1,1,2,2-tetrafluoroethane (R-134) and the like, as well as R-134a. These new substitute flon refrigerants are different from conventional flon refrigerants in characteristics. Thus, glycol compounds, ester compounds and the like have been proposed as the lubricant for use in combination with them (U.S. Pat. No. 4,755,316 and Japanese Patent Laid Open No. 33193/1991), but their wear resistance, cooling effect and stability have not been found satisfactory to a full extent.

SUMMARY OF THE INVENTION

The present inventor has made the studies with the lubricants which can be suitably used in combination with substitute flon refrigerants in compression-type refrigerating cycles employing said substitute flon refrigerants. As the result, it has been found that the compression-type refrigerating cycles can efficiently be lubricated by means of a combination of substitute flon refrigerants with the specific lubricants and the present invention has been completed on the basis of this finding.

An object of the present invention is to provide a method for efficiently lubricating a compression-type refrigerating cycle which comprises using a substitute flon compound in combination with a specific lubricant, effective for downsizing refrigerating equipment and having high industrial usefulness.

The present invention provides a method for lubricating a compression type-refrigerating cycle comprising a compressor, a condenser, an expansion valve, an evaporator and either or both of an oil separator and a hot gas line, which method comprises using a substitute flon refrigerant comprising as the essential component at least one compound selected from the group consisting of 1,1,1,2-tetrafluoroethane (R-134a); 1,1,2,2-tetrafluoroethane (R134); 1,1-dichloro-2,2,2-trifluoroethane (R123); 1-chloro-1,1-difluoroethane (R-142b); 1,1-difluoroethane (R-152a); trifluoromethane (R-23); difluoromethane (R-32); pentafluoroethane (R-125) and 1,1,1-trifluoroethane (R-143a), in combination with a lubricant having a kinematic viscosity of 2 to 50 cSt at 100° C. and an interfacial tension of 25 dyne/cm or above and being a liquid at ordinary temperature.

Figure 1:
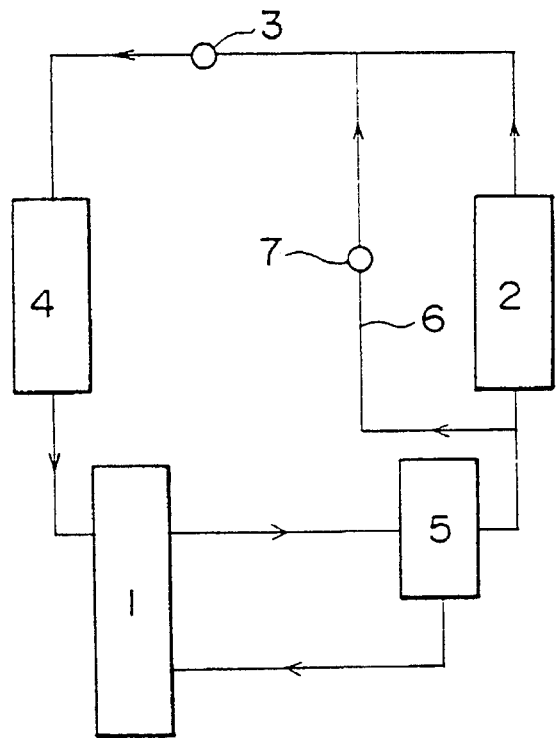
FIG. 1 is a flow chart showing the type A of a compression-type refrigerating cycle to which the present invention is applied.

1: Compressor
2: Condenser
3: Expansion valve
4: Evaporator
5: Oil separator
6: Hot gas line
7: Hot gas line valve

DESCRIPTION OF PREFERRED EMBODIMENTS

Usually a compression-type refrigerating cycle comprises a compressor, a condenser, an expansion valve and an evaporator. As the lubricant for refrigerators, generally a lubricant having a good miscibility with the refrigerant in the refrigerator is used.

However, if a substitute flon refrigerant is employed in said refrigerating cycle, accompanied by lubricating, the refrigerator with a conventional lubricant, the wear resistance or the stability is not sufficient, thereby preventing the long lasting and stable operation of the refrigerating cycle. A marked tendency toward this has been seen particularly in refrigerating cycles for example electric freezers and small size air-conditioners wherein capillary tubes are used as the expansion valve. In an attempt to find the solution in the foregoing problems, the present invention has been accomplished on the basis of a concept quite contrary to ordinary common knowledge, i.e., a concept that lubricants for refrigerating cycles are not necessarily required to have a miscibility with refrigerants to be used in the refrigerating cycles.

Namely, the distinguishing characteristic of the present invention is such that, when a compression type-refrigerating cycle having either or both of an oil separator and a hot gas line is operated by means of a substitute flon refrigerant, a lubricant having a kinematic viscosity of 2 to 50 cSt, preferably 3 to 30 cSt at 100° C. and an interfacial tension of 25 dyne/cm or above, preferably 30 to 80 dyne/cm and being a liquid at ordinary temperatures should be employed therein. Various lubricants having these properties can be used in the present invention. Their specific examples include mineral oil based (paraffin base, naphthene base, intermediate base) lubricants and various synthetic lubricating oils (for example, alkylbenzene, alkylnaphthalene, and poly-α-olefin.

Moreover, various additives can be added to these lubricants. The additives include extreme pressure agent such as phosphoric ester and phosphorous ester, antioxidant, chlorine capturing agent, metal deactivator, defoaming agent, detergent-dispersant, viscosity index improver, antirust agent, corrosion inhibitor, pour point depressant and the like.

In the present invention, there are used the refrigerants comprising as the essential component at least one compound selected from the group consisting of R-134a, R-134, R-123, R-142b, R-152a, R-23, R-32, R-125 and R-143a. These substitute flon compounds can be used singly or in their two or more mixture, and among them, R-134a and R-32 are most suitable. If their two or more mixture is desired, it is preferable to combine R-134a with R-32, R-32 with R-125 or R-134a and R-32 with R-125.

Said refrigerants may as well be used on addition of the following refrigerants at a low ratio. The refrigerants which can be added include chlorotetrafluoroethane (R-124), dichlorotetrafluoroethane (R-141b), 1,1-dichloro-2,2,3,3,3-pentafluoropropane (R-225ca), 1,3-dichloro-1,1,2,2,1-pentafluoropropane (R-225cb) and the like.

As described above, even with substitute flon refrigerants, the refrigerating cycles can be operated without detracting wear resistance, cooling effect and stability by the use of the lubricants having a kinematic viscosity of 2 to 50 cSt at 100° C. and an interfacial tension of 25 dyne/cm or above and being a liquid at ordinary temperatures. Therefore, the method of the present invention is effective for downsizing refrigerating equipment, having high industrial usefulness.

The invention will be described more specifically with reference to examples.

EXAMPLES 1 to 9 and Comparative Examples 1 to 41

A series of tests were conducted by using the real machine of various compression-type refrigerating cycles. The results thereof are shown below in these tests, the capillary tube type valve was used as the expansion valve.

Figure 2:
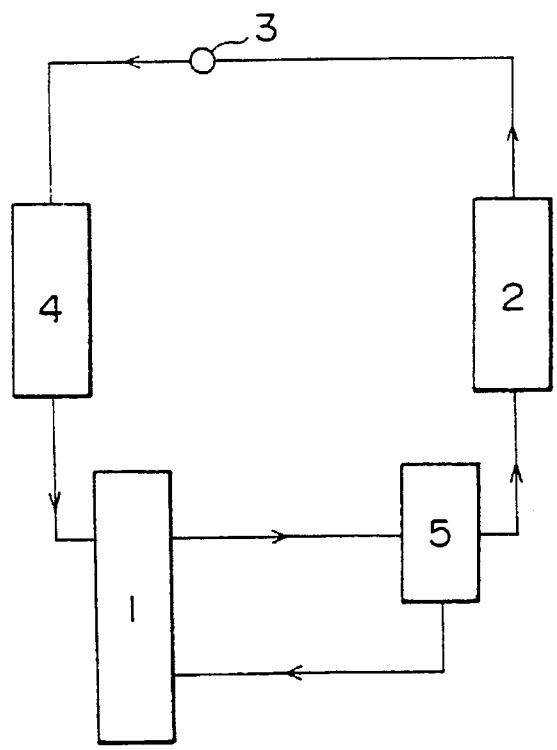
FIG. 2 is a flow chart showing the type B of a compression-type refrigerating cycle to which the present invention is applied.
Figure 3:
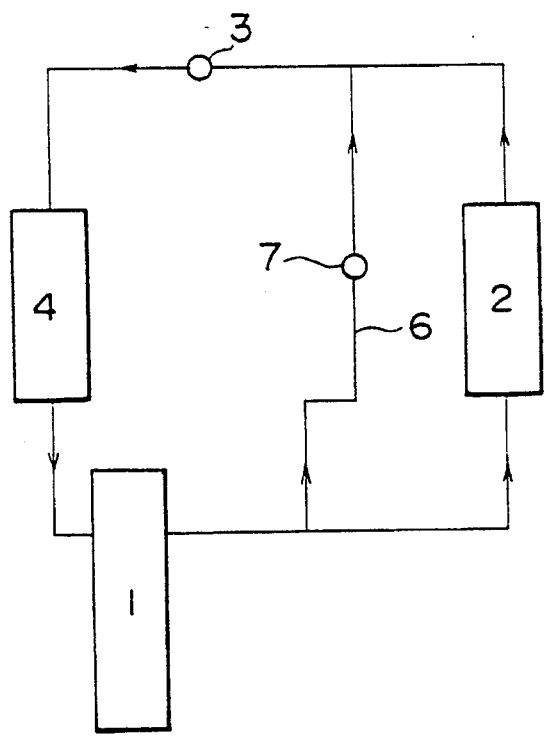
FIG. 3 is a flow chart showing the type C of a compression-type refrigerating cycle to which the present invention is applied.
Figure 4:
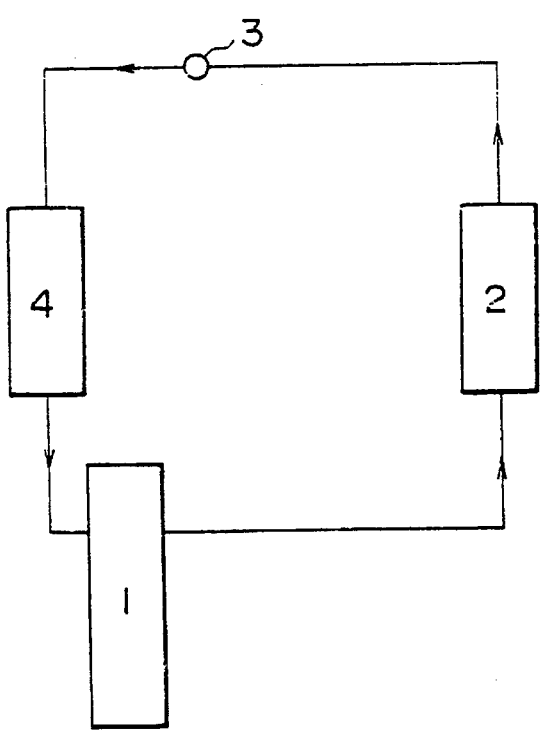
FIG. 4 is a flow chart showing the type D of a compression-type refrigerating cycle to which the present invention is applied.

The type of the compression-type refrigerating cycles:

type A: A compression-type refrigerating cycle comprising a compressor, a condenser, an expansion valve, an evaporator, an oil separator and a hot gas line. (See FIG. 1)

type B: A compression-type refrigerating cycle comprising a compressor, a condenser, an expansion valve, an evaporator and an oil separator. (See FIG. 2)

type C: A compression-type refrigerating cycle comprising compressor, a condenser, an expansion valve, an evaporator and a hot gas line. (See FIG. 3)

type D: A compression-type refrigerating cycle comprising a compressor, a condenser, an expansion valve and an evaporator. (See FIG. 4) The type D was for use in comparison.

The tests were conducted by using the type A, B, C and D refrigerators each having an output of 100 W and using R-134a as the substitute flon refrigerant. These refrigerators were operated with the following lubricants for a period of 1 year to examine the refrigeration thereof.

Operating conditions
 Evaporator temperature: −40° C.
 Condensation temperature: 30° C.

Evaluating method
1. Seven days after start of the operation, the temperature of the evaporator was measured.
2. Every time the operation was out of order, the refrigerators were brought to a halt and various parts thereof were observed to clear up the cause of disorders.

The lubricants used in the tests are listed in Table 1. The results of the tests by the use of real refrigerator are shown in Table 2.

EXAMPLES 10 to 18 and Comparative Examples 5 to 8

The refrigeration tests were likewise conducted under operation conditions of an evaporator temperature of −50° C. and a condensation temperature of 30° C. by using R-32 as the substitute flon refrigerant. These tests were carried out by the use of real refrigerator, resulting in the outcome shown in Table 3.

TABLE 1

| No. of lubricants | Lubricants | Kinematic Viscosity (100° C.) (cSt) | Interfacial Tension (dyne/cm) |
|---|---|---|---|
| 1 | Paraffinic mineral oil | 5.3 | 35.2 |
| 2 | Naphthenic mineral oil | 4.3 | 38.2 |
| 3 | Alkylbenzene | 4.7 | 52.4 |
| 4 | Alkylnaphthalene | 6.2 | 53.8 |
| 5 | Poly-α-olefin | 5.8 | 34.3 |
| 6 | Polyester | 9.1 | 11.7 |
| 7 | Hindered ester | 6.4 | 6.4 |

Interfacial tension: determined according to ASTM D971

TABLE 2

| No. | Refrigerating cycle | No. of lubricants | Evaporator temperature after 7 days (°C.) | Operating state and Observations |
|---|---|---|---|---|
| Example 1 | A | 1 | −40 | good order |
| Example 2 | A | 3 | −40 | good order |
| Example 3 | B | 1 | −40 | good order |

TABLE 2-continued

| No. | Refrigerating cycle | No. of lubricants | Evaporator temperature after 7 days (°C.) | Operating state and Observations |
|---|---|---|---|---|
| Example 4 | B | 2 | −40 | good order |
| Example 5 | B | 3 | −40 | good order |
| Example 6 | B | 4 | −40 | good order |
| Example 7 | B | 5 | −40 | good order |
| Example 8 | C | 2 | −40 | good order |
| Example 9 | C | 3 | −40 | good order |
| Comparative Example 1 | A | 6 | −40 | Halted for[*2] 6 months |
| Comparative Example 2 | A | 7 | −40 | Halted for[*2] 9 months |
| Comparative Example 3 | B | 7 | −40 | Halted for[*2] 9 months |
| Comparative Example 4 | D | 1 | −35[*1] | Halted for[*2] 15 days |

[*1]Due to poor expansion caused by the clogging of the capillary tubes
[*2]Due to the rise of discharge pressure caused by the clogging of the capillary tubes

TABLE 3

| No. | Refrigerating cycle | No. of lubricants | Evaporator temperature after 7 days (°C.) | Operating state and Observations |
|---|---|---|---|---|
| Example 10 | A | 1 | −50 | good order |
| Example 11 | A | 5 | −50 | good order |
| Example 12 | B | 1 | −50 | good order |
| Example 13 | B | 2 | −50 | good order |
| Example 14 | B | 3 | −50 | good order |
| Example 15 | B | 4 | −50 | good order |
| Example 16 | B | 5 | −50 | good order |
| Example 17 | C | 2 | −50 | good order |
| Example 18 | C | 5 | −50 | good order |
| Comparative Example 5 | A | 6 | −50 | Halted for[*2] 3 months |
| Comparative Example 6 | A | 7 | −50 | Halted for[*2] 6 months |
| Comparative Example 7 | B | 7 | −50 | Halted for[*2] 6 months |
| Comparative Example 8 | D | 1 | −45[*1] | Halted for[*2] 10 days |

[*1]Due to poor expansion caused by the clogging of the capillary tubes
[*2]Due to the rise of discharge pressure caused by the clogging of the capillary tubes In the present invention, it is particularly preferable to use, as the lubricant, at least one member selected from the group consisting of alkylbenzenes and alkylnaphthalenes.

When the alkylbenzene and/or alkylnaphthalene is used as the lubricant, the stability of the refrigerator at the time of its operation is particularly high. Therefore, even when severe operation, for example, strong cooling is carried out, the refrigerator can be stably used for a long period of time.

EXAMPLE 19

The same procedure as in Example 1 was carried out except that experimental conditions were changed as mentioned below. The results are shown in Table 4.
Type of refrigerator;
Type A refrigerator having an output of 100 W
Substitute flon refrigerant; R-32
Lubricant;
alkylbenzene of No. 3 in Table 1.

| Evaporator temperature | −60° C. |
|---|---|
| Condensation temperature | 30° C. |

Comparative Example 9

The same procedure as in Example 19 was carried out except that the lubricant in Example 19 was replaced with a paraffinic mineral oil of No. 1 in Table 1. The results are shown in Table 4.

TABLE 4

| No. | Refrigerating cycle | No. of lubricants | Evaporator temperature after 7 days (°C.) | Operating state and Observations |
|---|---|---|---|---|
| Example 19 | A | 3 | −60 | good order |
| Comparative Example 9 | A | 1 | −55*[1] | Halted for*[2] 15 days |

*[1]Due to poor expansion caused by the clogging of the capillary tubes
*[2]Due to the rise of discharge pressure caused by the clogging of the capillary tubes

What is claimed is

1. A method for lubricating a compression-type refrigerating cycle comprising a compressor, a condenser, an expansion valve, an evaporator and either or both of an oil separator, and a hot gas line, which method comprises using a substitute fluorocarbon refrigerant comprising as the essential component at least one compound selected from the group consisting of 1,1,1,2-tetrafluoroethane; 1,1,2,2-tetrafluoroethane; 1,1-difluoroethane; trifluoromethane; difluoromethane; pentafluoroethane; and 1,1,1-trifluoroethane, in combination with a lubricant consisting essentially of at least one member selected from the group consisting of alkylbenzenes and alkylnaphthalenes, having a kinematic viscosity of 2 to 50 cSt at 100° C. and an interfacial tension of 30 to 80 dyne/cm or above and being a liquid at ordinary temperatures.

2. A method according to claim 1 wherein the lubricant is alkylbenzene.

3. A method according to claim 1 wherein the lubricant is alkylnaphthalene.

4. A method according to claim 1 wherein the lubricant has a kinematic viscosity of 3 to 30 cSt at 100° C.

5. A method according to claim 2 wherein the lubricant has a kinematic viscosity of 3 to 30 cSt at 100° C.

6. A method according to claim 3 wherein the lubricant has a kinematic viscosity of 3 to 30 cSt at 100° C.

7. A method according to claim 1 wherein the refrigerant comprises 1,1,1,2-tetrafluoroethane as the essential component.

8. A method according to claim 1 wherein the refrigerant comprises difluoromethane as the essential component.

9. A method according to claim 1 wherein the refrigerant comprises as the essential component a mixture of 1,1,1,2-tetrafluoroethane and difluoromethane; difluoromethane and pentafluoroethane; or 1,1,1,2-tetrafluoroethane, difluoromethane and pentafluoroethane.

10. A method according to claim 1 wherein the compression-type refrigerating cycle comprises a compressor, a condenser, an expansion valve, an evaporator, an oil separator and a hot gas line.

11. A method according to claim 1 wherein the compression-type refrigerating cycle comprises a compressor, a condenser, an expansion valve, an evaporator and an oil separator.

12. A method according to claim 1 wherein the compression-type refrigerating cycle comprises a compressor, a condenser, an expansion valve, an evaporator and a hot gas line.

13. A method according to claim 2, wherein the substitute fluorocarbon refrigerant consists essentially of at least one compound selected from the group consisting of 1,1,1,2-tetrafluoroethane; 1,1,2,2-tetrafluoroethane; 1,1-difluoroethane; trifluoromethane; difluoromethane; pentafluoroethane; and 1,1,1-trifluoroethane.

14. A method according to claim 3, wherein the substitute fluorocarbon refrigerant consists essentially of at least one compound selected from the group consisting of 1,1,1,2-tetrafluoroethane; 1,1,2,2-tetrafluoroethane; 1,1-difluoroethane; trifluoromethane; difluoromethane; pentafluoroethane; and 1,1,1-trifluoroethane.

15. A method for lubricating a compression-type refrigerating cycle comprising a compressor, a condenser, an expansion valve, an evaporator and either or both of an oil separator, and a hot gas line, which method comprises using a substitute fluorocarbon refrigerant comprising as the essential component at least one compound selected from the group consisting of 1,1,1,2-tetrafluoroethane; 1,1,2,2-tetrafluoroethane; 1,1-difluoroethane; trifluoromethane; difluoromethane; pentafluoroethane; and 1,1,1-trifluoroethane, in combination with a lubricant consisting essentially of at least one member selected from the group consisting of alkylbenzenes and alkylnaphthalenes, having a kinematic viscosity of 2 to 50 cSt at 100° C. and an interfacial tension of 30 to 80 dyne/cm or above and being a liquid at ordinary temperatures and at least one additive selected from the group consisting of extreme pressure agent, antioxidant, chlorine capturing agent, metal deactivator, defoaming agent, detergent-dispersant, viscosity index improver, anti-rust agent, corrosion inhibitor and pour point depressant.

* * * * *